United States Patent

Meltzer et al.

[15] 3,671,544
[45] June 20, 1972

[54] 3,4,4A,9A-TETRAHYDRO-2-(1H)CARBAZOLONES

[72] Inventors: Robert I. Meltzer, Rockaway; Raymond R. Wittekind, Morristown, both of N.J.

[73] Assignee: Warner-Lambert Company

[22] Filed: July 13, 1970

[21] Appl. No.: 54,602

[52] U.S. Cl. ............... 260/315, 260/326.12, 260/326.13, 260/326.15, 260/326.16, 424/274
[51] Int. Cl. ............................................ C07d 27/68
[58] Field of Search .................................. 260/315

[56] References Cited

OTHER PUBLICATIONS

Chem. Commun. 1967:343, Douglas et al.

*Primary Examiner*—Henry R. Jiles
*Assistant Examiner*—S. D. Winters
*Attorney*—Albert H. Graddis, Frank S. Chow, Neil D. Edwards, Edward G. Comrie and Anne M. Kelly

[57] ABSTRACT

The present invention discloses a new class of carbazolones having the following structural formula:

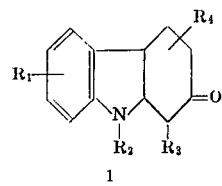

These compounds are prepared in accordance with the following reaction scheme:

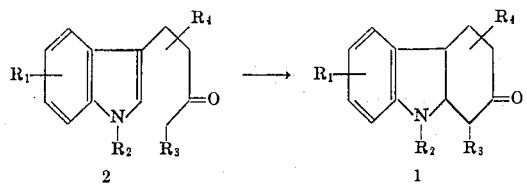

In the above, $R_1$ is hydrogen, lower alkyl, aryl, substituted aryl, aralkyl, lower alkoxy, aryloxy, lower alkylmercapto, arylmercapto, halo, trihaloalkyl, nitro, amino, substituted amino, acetamido, and substituted acetamido. $R_2$, $R_3$, $R_4$, which can be alike or different, are hydrogen, lower alkyl, aryl, substituted aryl and aralkyl. The compounds are useful as analgesic agents.

5 Claims, No Drawings

3,4,4A,9A-TETRAHYDRO-2-(1H)CARBAZOLONES

The present invention relates to a new class of carbazolones and more particularly the present invention relates to carbazolones having the following structural formula:

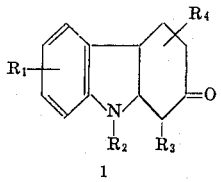

1

Wherein $R_1$ is hydrogen, lower alkyl, aryl, substituted aryl, aralkyl, lower alkoxy, aryloxy, lower alkylmercapto, arylmercapto, halo, trihaloalkyl, nitro, amino, substituted amino, acetamido, and substituted acetamido. $R_2$, $R_3$, $R_4$, which can be alike or different, are hydrogen, lower alkyl, aryl, substituted aryl and aralkyl.

As used throughout the specification and claims:

The term "lower alkyl" and the lower alkyl portion of lower alkoxy embraces both straight and branched chain alkyl radicals containing from one to six carbon atoms, for example, methyl, ethyl, propyl, isopropyl, n-butyl, n-amyl, n-hexyl, 2-ethylbutyl, 2,3-dimethylbutyl, and the like; the term "aryl" denotes a monocyclic aromatic hydrocarbon of six to eight carbon atoms, such as phenyl, tolyl and the like; the term "aralkyl" encompasses lower alkyl groups in which aryl as defined above is substituted for a hydrogen atom, such as for example, benzyl, phenethyl and the like; the term "substituted aryl" means an aryl as defined above in which one or more of the hydrogen atoms of the aryl portion have been substituted by a functional group such as halogen, hydroxyl, lower alkyl, trihalomethyl, amino, substituted amino, lower alkoxy and the like; the term "substituted aralkyl" means those aralkyl groups having further substituents in their portions, such as halogen, hydroxyl, lower alkyl, trihalomethyl, amino, substituted amino, lower alkoxy and the like; the term "halogen" encompasses all four halogens, such as fluorine, bromine, chlorine and iodine.

The symbols $R_1$, $R_2$, $R_3$ and $R_4$ as used hereinafter have the same meaning as described above.

The compounds of this invention exhibit analgesic activity in a mammalian host as, for example, cats, dogs, monkeys, guinea pigs and the like. For example, in animals, such as mice, they exhibit an ED 50 of about 150 mg. per kilogram. They are indicated, for example, in conditions such as neuralgia, headache and the like. Generally speaking, a dosage regimen of from about 100 mg. to 500 mg. several times daily is recommended. This dosage regimen can be varied by methods well known to the healing arts.

In order to use these compounds, they are combined with inert pharmaceutical diluants such as lactose, mannitol, dicalcium phosphate and the like and compounded into dosage forms such as tablets, capsules, injections by methods well known to the pharmaceutical art.

According to the present invention, these compounds are produced in accordance with the following reaction scheme:

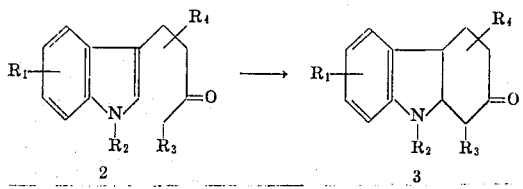

Generally speaking, reaction media of choice are, for example, trifluoroacetic acid and boron trifluoride etherate in a lower molecular weight alcohol such as methanol and the like.

The reaction temperature employed is generally the reflux temperatures of the selected reaction media.

The 4-(indol-3-yl)-2-butanones 2 are commercially available from the Aldrich Chemical Company, Milwaukee Wis. or prepared by the disclosure in the Journal of the American Chemical Society 79, 2819 (1957). Briefly, the reaction scheme involved is as follows:

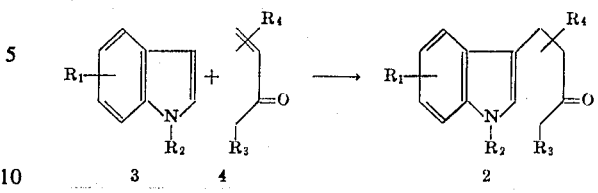

The N-substituted indolylbutanones 2 can be prepared by the alkylation of corresponding N-unsubstituted butanones 2. As an example of such an alkylation procedure, see for example, H. Plieninger, Ber., 87, 127 (1954).

In the above, the indoles-3 are also available from Aldrich Chemical Company. The $\alpha$, $\beta$-unsaturated ketones 4 are also available from the Aldrich Chemical Company. They can also be prepared by methods disclosed in "Synthetic Organic Chemistry", John Wiley and Sons, Inc., New York, N.Y., 1963, Chapter 10.

In order to further illustrate the practice of this invention, the following examples are included.

All temperatures are in degrees Centigrade.

EXAMPLE 1

4-(1-Benzlindol-3-yl)-2-butanone. A. Addition of 3-Buten-2-one to 1-Benzylindole. A solution of 1-benzylindole (65.7 g., 0.318 mole), 3-buten-2-one (66.6 g., 0.951 mole), acetic anhydride (110 ml.) and glacial acetic acid (330 ml.) was heated under reflux for 30 minutes and allowed to stand at room temperature for 18 hours. Distillation of the residue, obtained by concentration of the reaction mixture under reduced pressure, gave 59.6 g. of a viscous oil, b.p. 202.0°–210.0° (0.15–0.20 mm.), which solidified on standing. Recrystallization from 2-propanol afforded 50.0 g (56.8%) of the butanone, m.p. 72.0°–73.0°.

Anal. Calcd for $C_{19}H_{19}NO$: C, 82.27; H, 6.90; N, 5.05. Found: C, 82.09; H, 7.13; N, 4.95.

B. Benzylation of 4-(Indol-3-yl)-2-butanone. A solution of 4-(indol-3-yl)-2-butanone (10.0 g., 0.0535 mole), benzylchloride (7.6 g., 0.059 mole) and dimethylformamide (50 ml.) was added dropwise over 25 minutes, with stirring at 0° to a suspension of 53 percent sodium hydride-oil (2.8 g., 0.059 mole) and dimethylformamide (30 ml.). After the addition was complete, the mixture was stirred at 0° for 15 minutes. 2-Propanol (10 ml.) was added and the reaction mixture was concentrated under reduced pressure. The residue was dissolved in benzene and the solution was washed thoroughly with water, dried over anhydrous sodium sulfate, filtered and evaporated. Distillation of the residual oil from an oil-jacketed flask followed by recrystallization of the solidified distillate from absolute ethanol gave 7.4 g (51 percent) of the indolbutanone, m.p. 71.5°–73.0°.

EXAMPLE 2

9-Methyl-3,4,4a9a-tetrahydro-2(1H) carbazolone. A solution of 4-(1-methylindol-3-yl)-2-butanone (30.0 g., 0.149 mole) and freshly distilled trifluoroacetic acid (350 ml.) was allowed to stand at room temperature for two days. The reaction mixture was poured onto ice containing 50 percent potassium hydroxide solution (600 ml.) and extracted with methylene chloride. The organic extracts were dried over anhydrous potassium carbonate, filtered and concentrated in vacuo. The residual oil was dissolved in benzene and extracted with 2N hydrochloric acid. The combined aqueous extracts were cooled in an ice-bath, basified with 20 percent potassium hydroxide and extracted with methylene chloride. The organic extracts were washed with saturated sodium chloride solution, dried over anhydrous potassium carbonate and filtered. Recrystallization of the residual solid, obtained by concentration of the filtrate, from cyclohexane furnished 8.52 g. (28.4 percent) of the carbazolone, m.p. 65.5°–66.5°.

An analytical sample, obtained by sublimation at 50° (0.08 mm.) had m.p. 65.5°–66.5°.

Anal. Calcd for $C_{13}H_{15}NO$: C, 77.58; H, 7.51; N, 6.96; mol. wt. 201. Found: C, 77.75; H, 7.74; N, 7.06; mol. wt. (mass spectrometry) 201.

EXAMPLE 3

9-Benzyl-3,4,4a,9a-tetrahydro-2(1H) carbazolone. A solution of 4-(1-benzylindol-3-yl)-2-butanone (50.0 g., 0.180 mole) and freshly distilled trifluoroacetic acid (1.5 l.) was allowed to stand at room temperature for 2 days. The reaction mixture was poured onto ice-water (ca. 10 l.) containing 880 g. of 85 percent potassium hydroxide and extracted with methylene chloride. The organic extracts were washed with saturated sodium chloride solution, dried over anhydrous potassium carbonate, filtered and evaporated. Two recrystallizations of the solid residue from absolute ethanol afforded 10.5 g. (21.0 percent) of the carbazolone, m.p. 118.0°–119.0°.

Anal. Calcd for $C_{19}H_{19}NO$: C, 82.27; H, 6.90; N, 5.05. Found: C, 82.21; H, 7.00; N, 4.94.

EXAMPLE 4

3,4,4a,9a-tetrahydro-2(1H)carbazolone. A solution of 4-(indol-3-yl)-2-butanone (57.0 g.,0.305 mole), freshly distilled boron trifluoride etherate (1.2 l.) and methanol (6 l.) was allowed to stand at room temperature for 3 days. The reaction mixture was cooled in an ice-bath. Fifty percent sodium hydroxide solution (500 ml.) was added slowly, with stirring, and the resultant solid was collected and washed with methanol. The filtrate, cooled in an ice-bath, was acidified with 1N hydrochloric acid and extracted with benzene. The aqueous phase was cooled in an ice-bath, basified with 50 percent sodium hydroxide solution and extracted with methylene chloride. The organic extracts were washed with saturated sodium chloride solution, dried over anhydrous potassium carbonate and filtered. Distillation of the residual oil (28 g.), obtained by evaporation of the filtrate under reduced pressure, from an oil-jacketed flask at 170° (bath temp., 0.1 mm.) afforded 17.9 g. of a yellow oil which solidified on standing.

Recrystallization from 2-propanol gave 12.2 g. (21.4 percent) of the carbazolone, m.p. 87.0°–88.0°.

An analytical sample, prepared by sublimation at 78.0°–85.0° (0.1mm.) had m.p. 87.0°–88.0°.

Anal. Calcd for $C_{12}H_{13}NO$: C, 76.97; H,7.00; N, 7.48; mol. wt. 187. Found: C, 77.15; H, 7.27; N, 7.25; mol. wt. 187 (mass spectrometry).

We claim:

1. A compound of the formula:

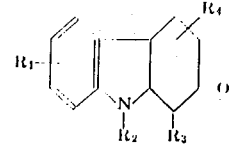

Wherein $R_1$ is hydrogen; $R_2$, $R_3$ and $R_4$ are each a member selected from the group consisting of hydrogen benzyl and lower alkyl.

2. A compound according to claim 1 which is 9-Methyl-3,4,4a,9a-tetrahydro-2(1H)carbazolone.

3. A compound according to claim 1 which is 9-benzyl-3,4,4a,9a-tetrahydro-2(1H)carbazolone.

4. A compound according to claim 1 which is 3,4,4a, 9a-tetrahydro-2(1H)carbazolone.

5. A process for the production of a compound according to claim 1 which comprises allowing to stand together a compound of the formula:

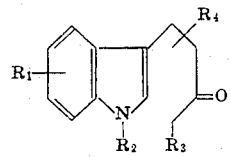

with trifluoroacetic acid or boron trifluoride etherate in a lower molecular weight alcohol at room temperature for 2 to 3 days.

* * * * *